(12) United States Patent
Hart et al.

(10) Patent No.: US 9,404,818 B2
(45) Date of Patent: Aug. 2, 2016

(54) PRESSURE SENSOR CARRIER

(75) Inventors: Pierre Hart, Calgary (CA); Larry Reid, Gibsons (CA); Bruce Malkinson, Calgary (CA)

(73) Assignee: Xsensor Technology Corporation, Calgary, Alberta (CA)

( * ) Notice: Subject to any disclaimer, the term of this patent is extended or adjusted under 35 U.S.C. 154(b) by 53 days.

(21) Appl. No.: 13/978,398

(22) PCT Filed: Feb. 23, 2012

(86) PCT No.: PCT/CA2012/000167
§ 371 (c)(1),
(2), (4) Date: Dec. 16, 2013

(87) PCT Pub. No.: WO2012/113065
PCT Pub. Date: Aug. 30, 2012

(65) Prior Publication Data
US 2014/0109697 A1    Apr. 24, 2014

Related U.S. Application Data

(60) Provisional application No. 61/445,914, filed on Feb. 23, 2011.

(51) Int. Cl.
| | | |
|---|---|---|
| G01L 1/04 | (2006.01) | |
| G01L 1/26 | (2006.01) | |
| A47C 21/00 | (2006.01) | |
| A47C 31/00 | (2006.01) | |
| A47C 31/12 | (2006.01) | |
| A61G 7/057 | (2006.01) | |

(52) U.S. Cl.
CPC . *G01L 1/26* (2013.01); *A47C 21/00* (2013.01); *A47C 31/00* (2013.01); *A47C 31/12* (2013.01); *A61G 7/057* (2013.01); *A61G 2203/34* (2013.01)

(58) Field of Classification Search
CPC ............ G01L 1/04; G01L 1/26; G01G 19/12; A47C 21/00; A47C 31/00; A61G 7/057; A61G 2203/35
USPC ....................................... 73/862.621; 5/504.1
See application file for complete search history.

(56) References Cited

U.S. PATENT DOCUMENTS

| | | | | |
|---|---|---|---|---|
| 5,815,861 A * | 10/1998 | LaGrange et al. | ............. | 5/504.1 |
| 5,853,005 A | 12/1998 | Scanlon | | |
| 6,778,090 B2 | 8/2004 | Newham | | |
| 7,124,759 B2 * | 10/2006 | Blakesley et al. | ............. | 128/869 |
| 7,652,581 B2 * | 1/2010 | Gentry et al. | ............... | 340/573.1 |

FOREIGN PATENT DOCUMENTS

EP    1639941    3/2006

* cited by examiner

*Primary Examiner* — Lisa Caputo
*Assistant Examiner* — Nathaniel T Woodward
(74) *Attorney, Agent, or Firm* — Bennett Jones LLP

(57) ABSTRACT

A pressure sensor carrier system of fasteners is provided for conveniently and removably attaching a pressure sensor carrier to the top surface of a bed mattress in a manner that minimizes stress concentrations, wrinkles and folds in the carrier. The carrier includes pliable elastic straps at each corner and articulated semi-rigid flaps at each longitudinal side. The tension in the elastic straps and the position of the articulated flaps are independently adjustable to accommodate mattresses of different dimensions.

7 Claims, 9 Drawing Sheets

PRESSURE SENSOR CARRIER

FIELD OF THE INVENTION

The present invention relates to a pressure sensor carrier having a system of fasteners for removably attaching a pressure sensor carrier to the top surface of a mattress.

BACKGROUND OF THE INVENTION

Pressure sensors may be used in clinical or commercial applications to measure the pressure profiles exerted by subjects' bodies on the surfaces of mattresses. Typical pressure sensors consist of an array of electrical conductors disposed between pliable sheets in a mat. The pressure sensor mat may be disposed within a pressure sensor carrier that is placed between the subject's body and the surface of the mattress. The weight and movement of the subject's body tend to displace the carrier and deform the bed mattress at the interface with the carrier. Thus, fasteners may be used to secure the carrier to the bed mattress and maintain contact between the mattress and the carrier. In its simplest form, the pressure sensor carrier is placed underneath a fitted sheet which covers the mattress. However, the mat will shift and bunch up underneath the sheet. Alternative means of fastening the carrier to bed mattresses include use of fitted sheets, zippers, buttons, Velcro®, ties and other conventional fasteners.

As is known to those skilled in the art, the particular fastening means used can affect the tension fields in the carrier and cause artifacts such as wrinkles, creases and folds in the carrier. These effects can interfere with or degrade the accuracy of the measurements made by the pressure sensor. Artifacts can cause discomfort, body sores and ulcerations for users who are immobilized in bed for prolonged periods. Folds or creases in the carrier may also trap fluids and make the carrier more difficult to clean.

SUMMARY OF THE INVENTION

In one aspect, the invention comprises a pressure sensor carrier having a substantially quadrangular and planar form, for use with a bed mattress having a substantially quadrangular form, having a top surface, bottom surface, two longitudinal sides and two transverse sides, said carrier comprising:

(a) first and second longitudinal edges, and first and second transverse edges, each substantially coincident with the longitudinal sides and transverse sides, respectively, of the mattress;

(b) first and second elastic end straps disposed at the first and second transverse edges respectively, wherein each end strap comprises a pliable, elastic member comprising:
  (i) a middle portion attached to the proximal transverse edge;
  (ii) a first arm extending from the middle portion and attached to the first longitudinal edge;
  (iii) a second arm extending from the middle portion and attached to the second longitudinal edge;

(c) first and second articulated flaps disposed at the first and second longitudinal edges respectively, wherein each articulated flap comprises:
  (i) a pliable elastic portion having a top edge attached to the proximal longitudinal edge, and a bottom edge; and
  (ii) at least one rigid portion having a top edge attached to the bottom edge of the pliable elastic portion.

In another aspect, the invention comprises a pressure sensor carrier adapted to conform to the size and shape of a bed mattress, said carrier comprising at least one fastener comprising an articulated flap, said articulated flap comprising a pliable elastic portion having a top edge attached to the proximal edge of the carrier and a bottom edge, and at least one rigid portion having a top edge attached to the bottom edge of the pliable elastic portion.

In one embodiment of the aforementioned pressure sensor carriers, the at least one rigid portion comprises a first rigid portion having a top edge attached to the bottom edge of the pliable elastic portion and a bottom edge, and a second rigid portion having a top edge hingedly attached to the bottom edge of the first rigid portion.

In one embodiment of the aforementioned pressure sensor carrier, at least one of the first and second end straps comprises an adjustable tensioner strap that overlays the first arm or second arm and comprises a fastener for adjustably setting the length of the strap, thereby effectively lengthening or shortening the first arm or second arm.

In one embodiment of the aforementioned pressure sensor carriers, at least one of the first and second articulated flaps comprises adjustable fastener means for adjustably attaching the top edge of the pliable elastic portion of the articulated flap to the proximal edge of the carrier.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows:

FIG. 11b shows a side elevation view of the articulated flap of FIG. 11a.

FIG. 12 shows a bottom perspective view of a bed mattress with a pressure sensor carrier attached by a system of fasteners with the end straps of FIG. 10 and the articulated flaps of FIG. 11a.

DETAILED DESCRIPTION OF PREFERRED EMBODIMENTS

The invention relates to a system for removably fastening a pressure sensor carrier to a bed mattress. When describing the present invention, all terms not defined herein have their common art-recognized meanings. To the extent that the following description is of a specific embodiment or a particular use of the invention, it is intended to be illustrative only, and not limiting of the claimed invention. The following description is intended to cover all alternatives, modifications and equivalents that are included in the spirit and scope of the invention, as defined in the appended claims.

Figure 1:
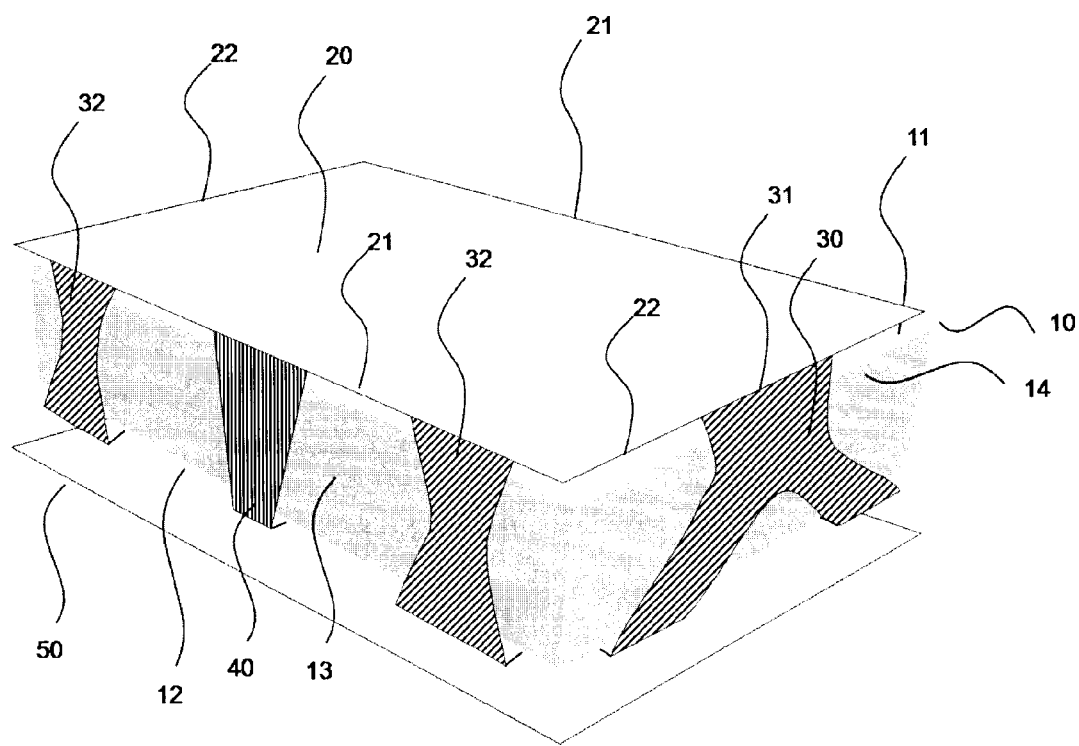
FIG. 1 shows a top perspective view of a bed mattress with a pressure sensor carrier attached by a system of fasteners.
Figure 2:
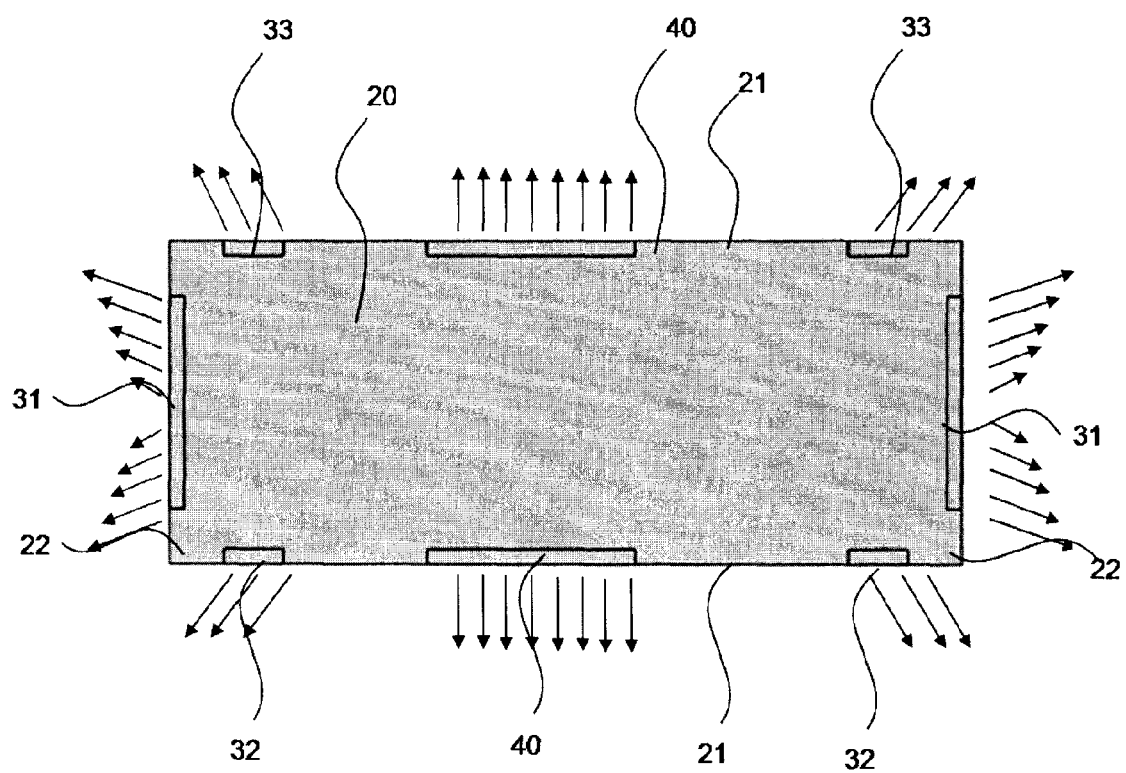
FIG. 2 shows a plan view corresponding to that of FIG. 1.
Figure 3:
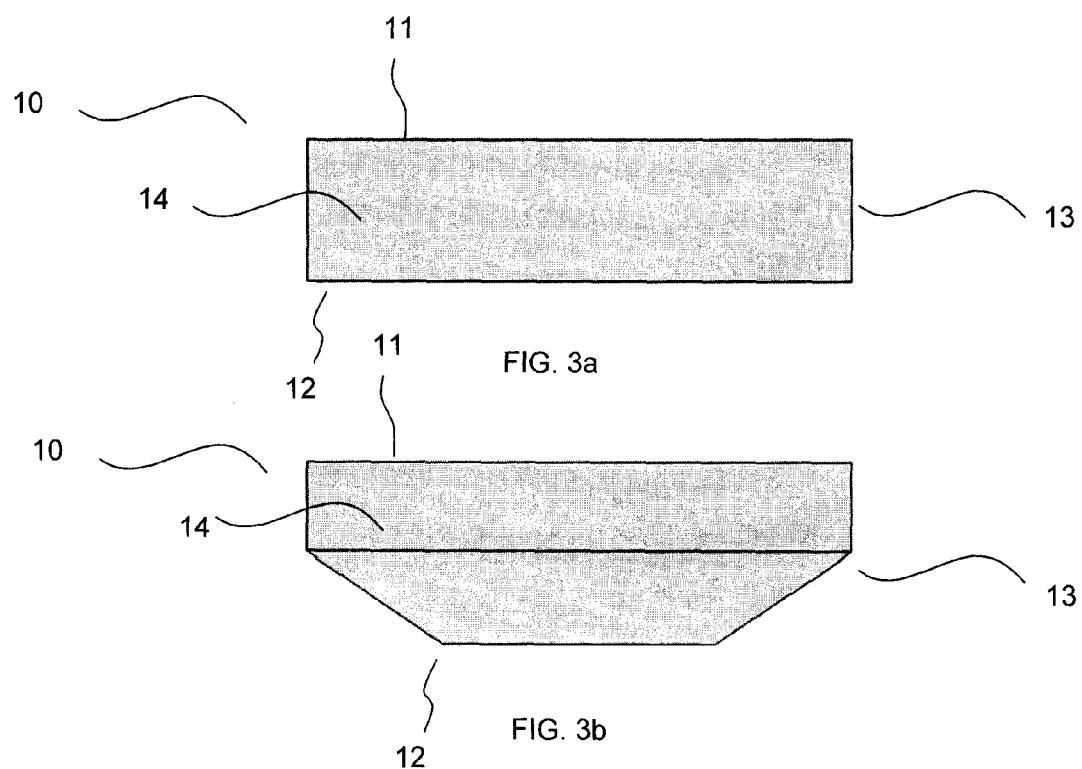
FIG. 3a shows an elevation view of the transverse side of the bed mattress with a single-faceted longitudinal side.
FIG. 3b shows an elevation view of the transverse side of the bed mattress with a multi-faceted longitudinal side.

As shown in FIG. 1, a substantially quadrangular bed mattress (10) has a top surface (11), a bottom surface (12), two longitudinal sides (13) and two transverse sides (14), supported by a bed frame (50). As shown in FIG. 3a, the longitudinal side (13) of the bed mattress (10) may be single faceted, or as shown in elevation view in FIG. 3b, the longitudinal side (13) of the bed may be multi-faceted.

As shown in FIG. 1, a pressure sensor carrier (20) is substantially quadrangular and planar in form and is adapted to cover the top surface (11) of the mattress (10). The carrier comprises two longitudinal edges (21) and two transverse edges (22) substantially coincident with the longitudinal sides (13) and transverse sides (14), respectively, of the mattress (10). The carrier (20) may be manufactured in a shape which corresponds to the shape of the mattress it is intended to be used with, and may include shapes other than a standard rectangular shape. It is not essential that each edge be a straight line. It is also not essential that the angle between any transverse edge and any longitudinal edge be 90 degrees. The carrier should preferably be shaped so as to cover a sufficient area of the mattress to provide useful pressure measurement information when the mattress is in use by a subject, and to be well-fitted to the mattress using the system described herein.

In one embodiment, the carrier (20), when installed on a mattress, is fastened in a two-dimensional state of tension to the bed mattress by a system of fasteners comprising two end straps (30) oppositely disposed at each transverse edge (22) and two articulated flaps (40) oppositely disposed at each longitudinal edge (21). As is well known in the industry, many beds, and hospital beds in particular, articulate along at least one transverse axis, and often two transverse axes. In practice, where the mattress (10) is capable of bending about articulation points, the articulated flaps (40) may be disposed along the longitudinal edges (21) of the carrier (20) in between articulation points, or at least so it does not overlay any articulation point. In practice, the geometry and mechanical properties of the end straps (30) and the articulated flaps (40) are selected to accommodate the geometry of the bed mattress (10), to optimize the tension in the carrier (20) and to minimize pressure artifacts in the carrier (20). In other embodiments not shown, fewer or additional elastic end straps (30) or articulated flaps (40) may be employed.

Figure 4:
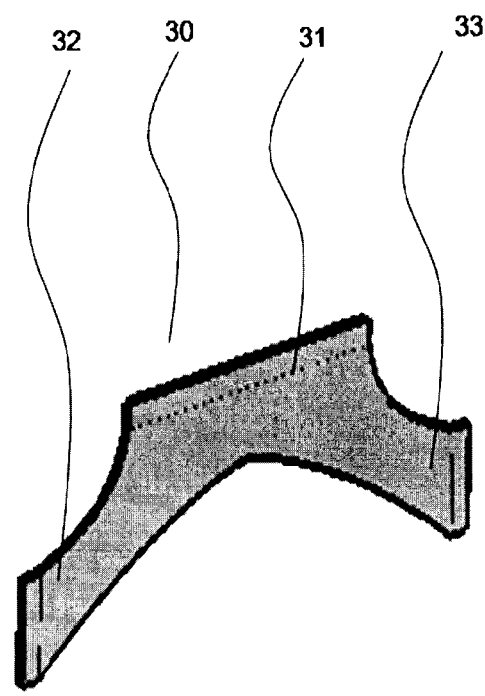
FIG. 4 shows a perspective view of an end strap.

In one embodiment, as shown in FIG. 4, each end strap (30) comprises a pliable, elastic member having a middle portion (31), a first arm (32) extending from the middle portion (31) and a second arm (33) extending from the middle portion (31). The middle portion (31) attaches to the proximal transverse edge (22) of the carrier (20), while the first and second arms (32, 33) attach to opposite longitudinal edges (21) of the carrier (20). Collectively, the two arms (32, 33) of each of the two elastic end straps (30) in tension, removably and wrappingly engage the four corners of the mattress (10) and pull the transverse edges (22) of the carrier (20) against the top surface (11) of the mattress (10) and towards the transverse sides (14) of the mattress (10), thereby developing a tensile stress in the carrier (20) in the direction parallel to the longitudinal edges (21) of the carrier (20).

In one embodiment, the end straps (30) are elastic. In another embodiment, the end straps each comprise a length adjustable strap which allows the first and second arms (32, 33) to be pulled towards the middle portion (31), in which case the end straps are not necessarily elastic.

Figure 5:
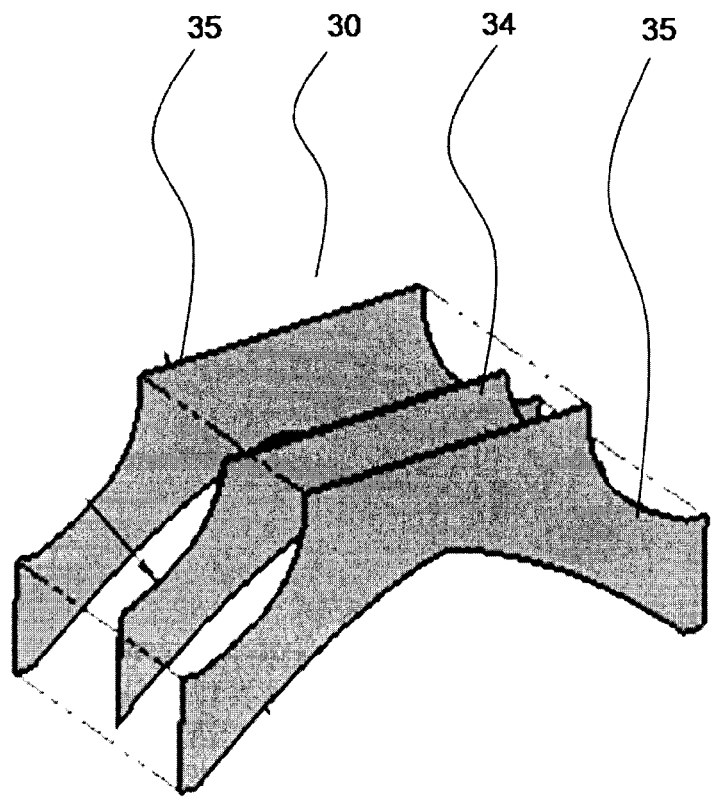
FIG. 5 shows an exploded perspective view of an end strap.

In one embodiment, as shown in FIG. 5, the end strap (30) has a multi-layer construction, with an inner layer (34) made of a pliable elastic material, such as neoprene, laminated and bonded to two outer layers (35) made of a pliable fabric such as polyester. The outer layers (35) may be constructed with materials or treated with coatings that make them water-resistant, and easy to clean and disinfect.

In one embodiment, each articulated flap (40) comprises a pliable elastic portion (41) having a top edge attached to the proximal longitudinal edge (21) of the carrier (20) and a bottom edge, and a rigid portion (42) having a top edge attached to the bottom edge of the pliable elastic portion (41). The rigid portion (42) is removably held by friction between the bottom surface (12) of the mattress (10) and the bed frame (50), thereby anchoring the articulated flap (40). The pliable elastic portion (41) conforms to the longitudinal side (13) of the mattress (10). The pliable elastic portion (41), in tension, pulls the longitudinal edges (21) of the carrier (20) against the top surface (11) of the mattress (10) and towards the longitudinal sides (13) of the mattress (10), thereby developing a tensile stress in the carrier (20) in the direction parallel to the transverse edges (22) of the carrier (20).

Figure 6:
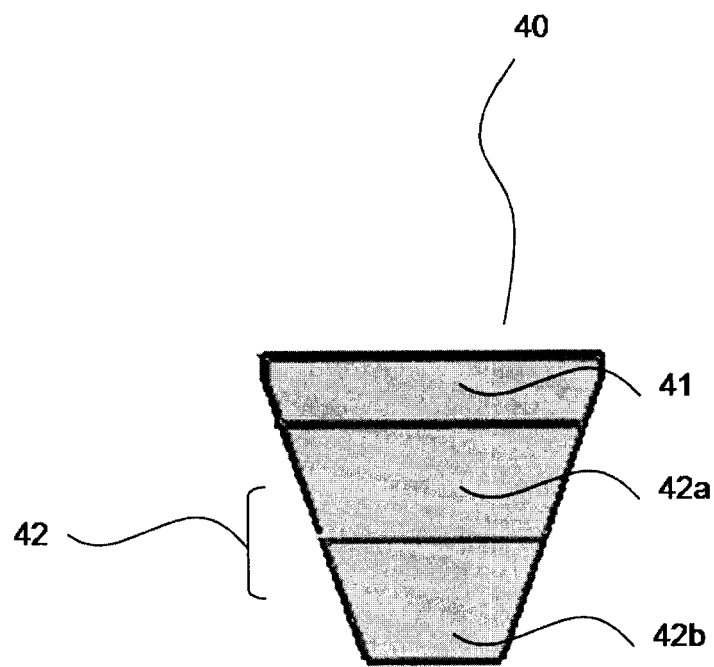
FIG. 6 shows an elevation view of an articulated flap.
Figure 8:
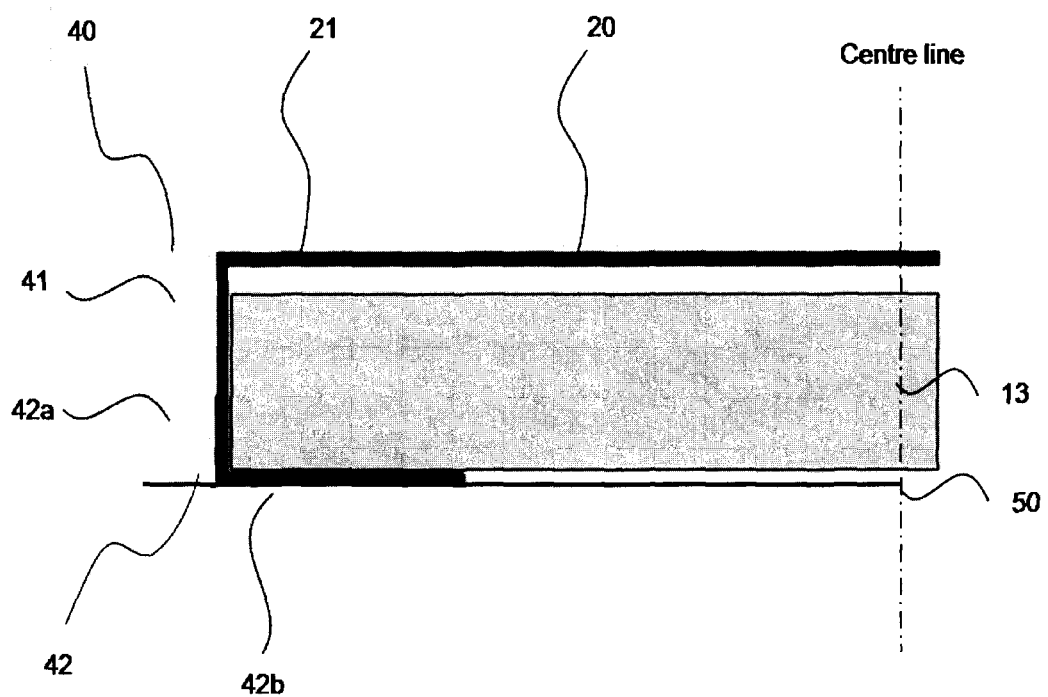
FIG. 8 shows an elevation view of half of the transverse side of the bed mattress with an articulated flap.

In one embodiment, as shown in FIG. 6, the rigid portion (42) comprises a first rigid portion (42a) having a top edge attached to the bottom edge of the pliable elastic portion (41) and a bottom edge, and a second rigid portion (42b) having a top edge hingedly attached to the bottom edge of the first rigid portion (42a). The second rigid portion (42b) is removably held by friction between the bottom surface (12) of the mattress (10) and the bed frame (50), thereby anchoring the articulated flap (40). The positioning of the first and second rigid portions when installed on a box-style mattress is shown in FIG. 8. The pliable elastic portion (41) and the first rigid portion (42a) conform to the longitudinal side (13) of the mattress (10).

A rigid portion (42) that has a first rigid portion (42a) and a second rigid portion (42b) may better conform to a mattress (10) having a multi-faceted longitudinal side (13) such as shown in FIG. 3b. Such mattresses are known as "basin-style" mattresses.

Figure 7:
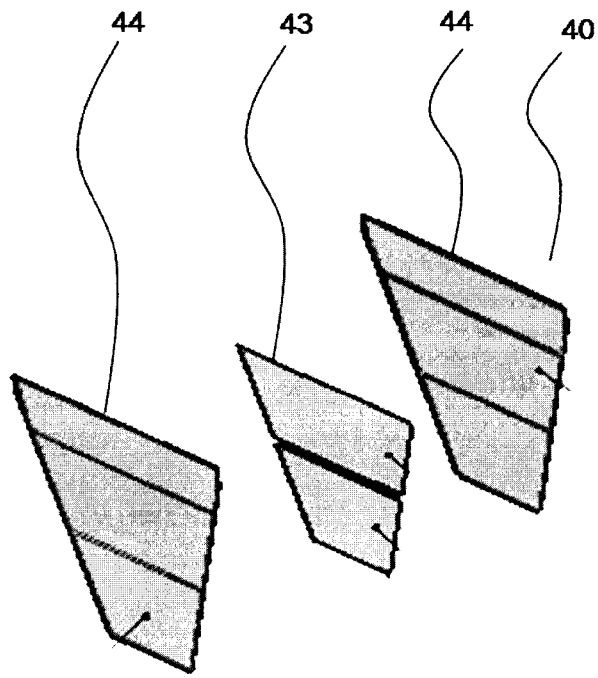
FIG. 7 shows an exploded perspective view of an articulated flap.

In one embodiment shown in FIG. 7, the articulated flap (40) comprises an inner layer (43) made of a rigid or semi-rigid material laminated between two outer layers (44) made of a pliable elastic material. A fold in the inner layer (43) hingedly attaches the bottom edge of the first rigid portion (42a) to the top edge of the second rigid portion (42b). The portion of the outer layers (44) that are not laminated to the inner layer (43) defines the pliable elastic portion (41). As is known to those skilled in the art, the outer layers (44) may be constructed of materials or coated so that articulated flaps (40) are water-resistant, easy to clean and disinfect, and develop sufficient friction with the bottom surface (11) of the mattress (10) to resist slippage between these interfaces. The outer layers may comprise a high-friction material for that purpose.

Figure 9:
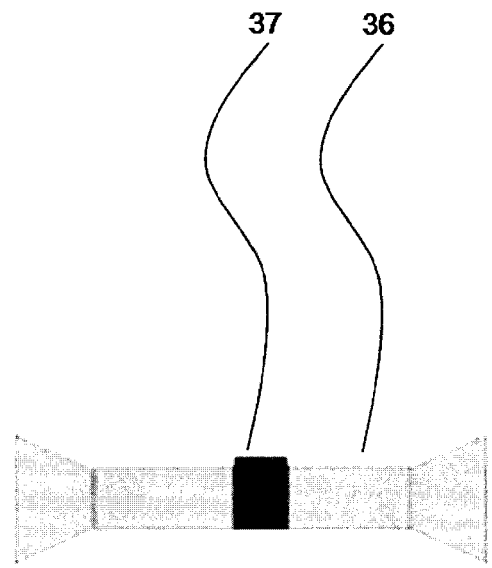
FIG. 9 shows an elevation view of an adjustable tensioner strap.
Figure 10:
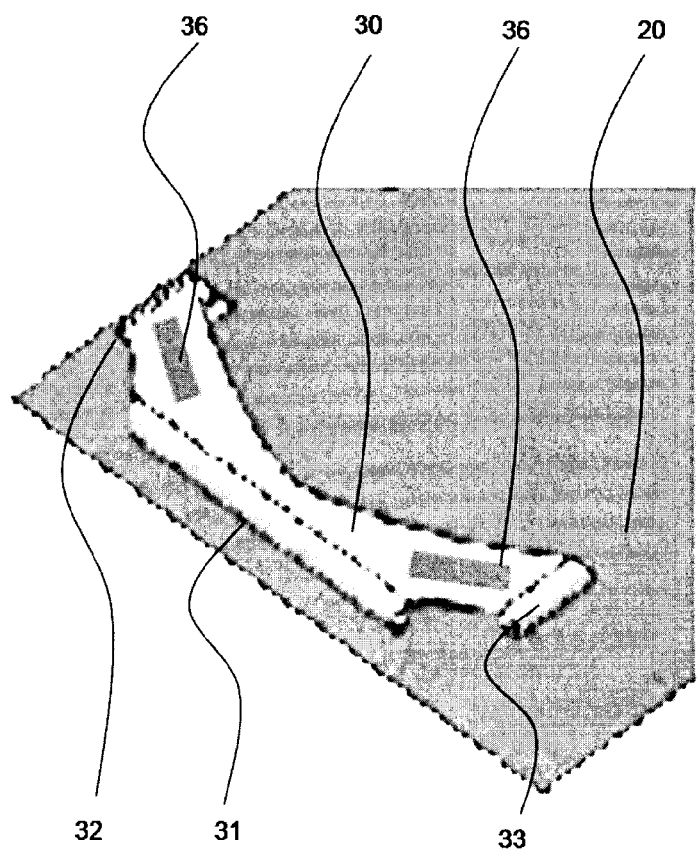
FIG. 10 shows a perspective view of an end strap with the adjustable tensioner strap of FIG. 9.

In one embodiment shown in FIG. 10, the end strap (30) comprises at least one adjustable tensioner strap (36) for tightening or relaxing the elastic end strap (30) so that it can accommodate mattresses (10) with a variety of dimensions. As shown in FIG. 9, the adjustable tensioner strap (36) comprises a fastener (37). The adjustable tensioner strap (36) overlays either the first arm (32) or the second arm (33) of the elastic end strap (30). The fastener (37) adjustably sets the length of the adjustable tensioner strap (36), effectively lengthening or shortening and the first arm (32) or, as the case may be, the second arm (33) of the elastic end strap (30). Preferably, both the first and second arms feature an adjustable tensioner strap. The fastener (37) may be implemented with a ladder lock buckle, slip lock buckle, tension lock buckle or other fasteners known to persons skilled in the art.

Figure 11A:
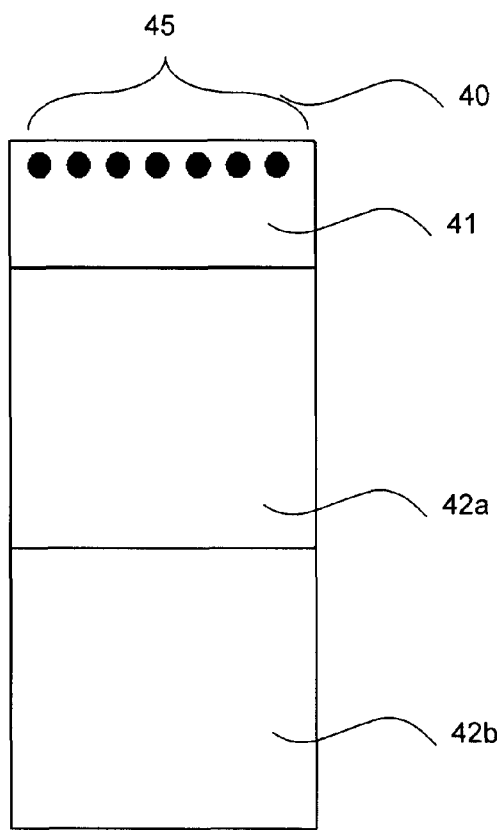
FIG. 11a shows an elevation view of an articulated flap with an adjustable fastener means.
Figure 11B:
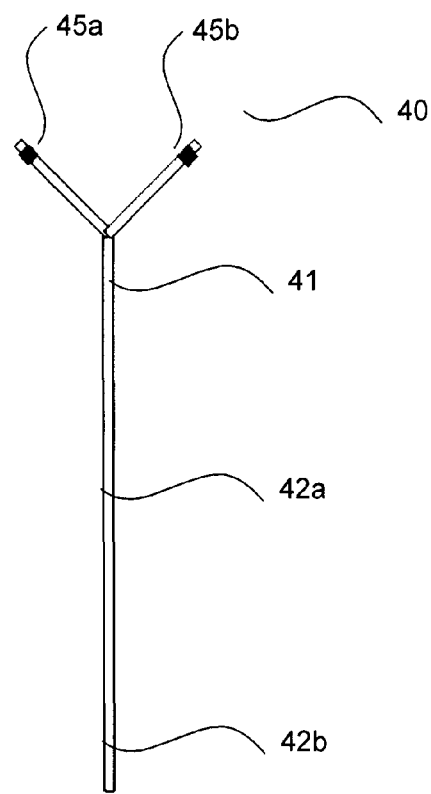
Figure 12:
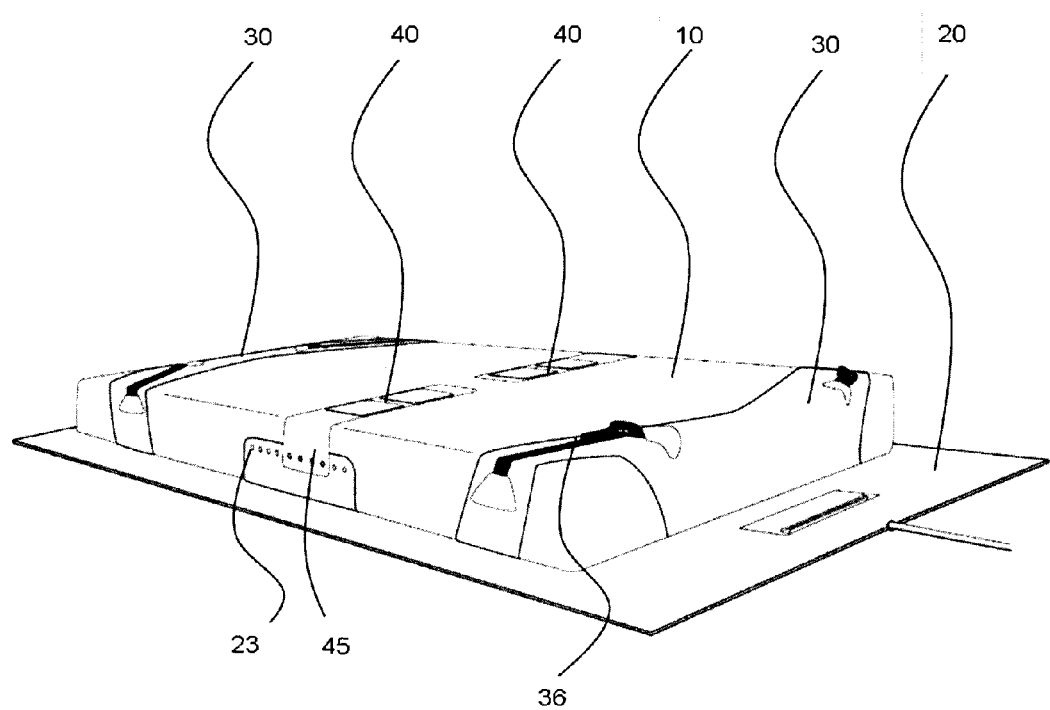

In one embodiment shown in FIG. 11a and FIG. 11b, the articulated flap (40) comprises an adjustable fastener means (45) disposed on the top edge of the pliable elastic portion (41) for removably and adjustably attaching the top edge of the articulated flap (40) to the proximal longitudinal edge (21) of the carrier. The fastener means (45) permits the articulated flap (40) to be positioned at a desired location along the longitudinal edge (21) of the carrier (20), for instance so as to avoid an articulation point in an articulated mattress As shown in FIG. 11a, FIG. 11b, and FIG. 12, the fastener means is implemented by a plurality of snap fasteners, wherein each snap has a male side (45a) and a female side (45b) connecting through a plurality of mounting holes (23) in the longitudinal edge (21) of the carrier (20). In other embodiments not shown, the fastener means (45) may be implemented with zippers, buttons, Velcro®, ties and other conventional fasteners known to persons skilled in the art, with or without the need for mounting holes (23) in the carrier (20).

FIG. 12 shows one embodiment of the pressure sensor carrier of the present invention implemented with elastic end straps (30) with adjustable tensioner straps (36) and articulated flaps (40) with fasteners allowing for adjustable positioning (45). In this diagram, the mattress and carrier are shown upside-down to allow illustration of the elements described herein.

Although the present invention has been described with reference to the preferred embodiments, the scope of the claims should not be limited by the preferred embodiments set forth in the examples, but should be given the broadest interpretation consistent with the description as a whole.

What is claimed is:

1. A pressure sensor carrier for use with a bed mattress with a quadrangular form, the mattress having a top surface, bottom surface, two longitudinal sides and two transverse sides, the carrier comprising:
   (a) first and second longitudinal edges, and first and second transverse edges, each aligned with the longitudinal sides and transverse sides, respectively, of the mattress;
   (b) first and second end straps disposed at the first and second transverse edges, respectively, wherein each end strap comprises a pliable member which is elastic or length adjustable;
   (c) first and second articulated flaps disposed at along the first and second longitudinal edges respectively, wherein each articulated flap comprises:
      (i) a pliable elastic portion having a top edge attached to the proximal longitudinal edge, and a bottom edge;
      (ii) at least one planar rigid portion having a top edge attached to the bottom edge of the pliable elastic portion;
   (d) and wherein the first and second end straps and the first and second articulated flaps are configured to cooperate to create a two-dimensional state of tension in the carrier to minimize pressure artifacts in the carrier.

2. The pressure sensor carrier of claim 1 wherein each end strap comprises:
   (a) a middle portion attached to the proximal transverse edge;
   (b) a first arm extending from the middle portion and attached to the first longitudinal edge; and;
   (c) a second arm extending from the middle portion and attached to the second longitudinal edge.

3. The pressure sensor carrier of claim 1 or claim 2 wherein the at least one planar rigid portion comprises a first rigid portion having a top edge attached to the bottom edge of the pliable elastic portion and a bottom edge, and a second rigid portion having a top edge hingedly attached to the bottom edge of the first rigid portion.

4. The pressure sensor carrier of claim 1 wherein at least one of the first and second elastic end straps comprises at least one adjustable tensioner strap which overlays the first arm or the second arm and comprises a fastener for adjustably setting the length of the strap, effectively lengthening or shortening the first arm or the second arm.

5. The pressure sensor carrier of claim 4, wherein the fastener comprises a ladder lock buckle, a slip lock buckle, or a tension lock buckle.

6. The pressure sensor carrier of claim 1 wherein one or both of the first and second articulated flaps comprises adjustable fastener means for adjustably attaching the top edge of the pliable elastic portion of the articulated flap to the proximal longitudinal edge of the carrier.

7. The pressure sensor carrier of claim 6, wherein the adjustable fastener means comprises a snap fastener, a zipper, a button, a tie, or a hook-and-loop type fastener.

* * * * *